United States Patent Office 3,379,702
Patented Apr. 23, 1968

3,379,702
METHOD FOR PREPARING TERPOLYMERS OF ETHYLENE, ACRYLIC ACIDS AND SALTS OF ACRYLIC ACIDS
Ben Edward Spivey, Lake Jackson, Tex., assignor to The Dow Chemical Company, Midland, Mich., a corporation of Delaware
No Drawing. Filed June 14, 1965, Ser. No. 463,917
7 Claims. (Cl. 260—80.8)

ABSTRACT OF THE DISCLOSURE

A terpolymer of ethylene, acrylic acid or methacrylic acid, and a salt of the acid is produced by reacting ethylene, the acid, and the salt of the acid, in the presence of an organic solvent which is a solvent for the acid and the salt of the acid, and in the presence of a free radical-producing catalyst at a temperature of between 100° and 300° C. and a pressure of between 3000 and 50,000 p.s.i.

---

This invention pertains to ethylene polymers and more particularly to terpolymers of ethylene with acrylic or methacrylic acid monomers and alkali salts of the acid monomers having improved rigidity.

Copolymers of α-olefins with α,β-ethylenically unsaturated carboxylic acid having one or two carboxylic acid groups partially neutralized with an alkali hydroxide are known to the art e.g. French Patent 1,336,464. The copolymers may be partially neutralized and ionically cross-linked by homogeneously distributing an alkali metal compound in the copolymer and heating the mixture at elevated temperatures as by melt blending.

The extended period of time at elevated temperatures necessary to homogeneously blend the alkali metal compound in the α-olefin unsaturated carboxylic acid copolymer is not only economically disadvantageous but causes undesirable degradation. In addition the copolymers have certain properties which render them unsuitable for certain applications. For example, the low rigidity of the molded copolymer renders it unpracticable for bottle fabrication.

According to the present invention ethylene polymers having improved rigidity are economically and continuously prepared by polymerizing ethylene with acrylic or methacrylic acid and an alkali metal salt of the acid.

The resultant terpolymers generally contain at least 50 percent by weight of ethylene and preferably about 60 to about 88 percent by weight ethylene, about 8 to about 20 percent by weight, preferably about 10 to about 15 percent by weight of acrylic or methacrylic acid and 2 to about 40 percent by weight of the alkali metal salt of the acid.

Illustrative examples of alkali metal salts of acrylic or methacrylic acid include sodium acrylate, potassium acrylate, lithium acrylate, sodium methacrylate, potassium methacrylate, and lithium methacrylate.

The terpolymers can be continuously prepared by polymerizing mixtures of ethylene, acrylic or methacrylic acid and an alkali metal salt of the acid in continuous polymerization reactors such as tubular or autoclave reactors at pressures from about 3,000 to about 50,000 pounds per square inch, or higher, and at temperatures from about 100° C. to about 300° C. using, at catalytically effective concentrations, free-radical-producing polymerization catalysts as azo catalysts such as α,α-azobisisobutyronitrile and peroxygen-type catalysts such as diethyl peroxide, hydrogen peroxide, di-tertiary butyl peroxide, and lauroyl peroxide. Such catalysts usually are used in the concentration range of from about 0.1 pound to about 1 pound, based on 100 pounds of copolymer product. These catalysts are suitably introduced into the polymerization zone dissolved in an organic solvent such as benzene, toluene, hexane and the like. Other methods of catalysis such as irradiation by ultraviolet, X-ray and gamma rays as well as by radiation from linear accelerators, resonant transformers, and the like, may be used if desired.

Because of the instability of the alkali metal salt of the acid, the salt is preferably prepared by reacting acrylic or methacrylic acid with an alkali hydroxide just immediately prior to the introduction of the alkali metal salt to the polymerization zone.

The alkali metal salt of acrylic or methacrylic acid may be advantageously prepared by introducing a concentrated solution of the alkali metal hydroxide into the feed line that supplies the acid to the polymerization zone. It is also highly advantageous in the above manner to choose a proper solvent for the alkali hydroxide. It is highly desirable to employ a solvent which is a common solvent for the acid and the salt of the acid. Suitable solvents include the lower alkanols as for example, aliphatic alcohols containing 1 to 5 carbon atoms such as methanol, ethanol and pentanol although water and mixtures of water with one or more of the alkanols may be employed. In addition, the lower aliphatic ketones such as acetone may also be employed as a solvent for the alkali hydroxide. Preferably methyl alcohol and ethyl alcohol are employed as solvents.

The terpolymers of this invention combine the useful properties of polyethylene with new properties attributable to the presence of acidic and alkali metal moieties in the homogeneous terpolymers. Thus, these terpolymer products are transparent, rigid thermoplastic solids, which can be readily molded in conventional polyethylene equipment by compression, injection, extrusion, etc. They are corrosion resistant, solvent and moisture resistant, unpermeable, and because of their excellent rigidity are particularly adapted for the fabrication of bottles.

To illustrate the manner in which the invention may be carried out, the following examples are given. It is to be understood, however, that the examples are for the purpose of illustration and the invention is not to be regarded as limited to any of the specific materials or conditions recited therein. Unless otherwise stated, all percentages cited in the examples below are based on weight.

Example 1

Ethylene was copolymerized with acrylic acid and the sodium salt of acrylic acid by introducing ethylene at a feed rate of 48 lbs./hr. and acrylic acid at a feed rate of 2.28 lbs./hr. into a 3 liter pressure autoclave. Sodium acrylate was prepared immediately prior to its being fed to the autoclave by introducing a concentrated methanol solution of sodium hydroxide (about 18 percent) into the acrylic acid feed line at a feed rate of 1.5 lbs./hr. The reaction was carried out in a continuous manner in the autoclave stirred at 2,400 r.p.m. at a temperature of about 195° to 200° C. and a pressure of about 21,000 p.s.i.

The catalyst, α,α-azoisobisbutyronitrile was introduced into the autoclave in the form of a solution consisting of 4 percent by weight catalyst dissolved in a mixture of 80 parts benzene and 20 parts hexane at a feed rate of 0.07 lb./hr. The resultant terpolymer containing 8.1 percent by weight acrylic acid and 27.0 percent by weight sodium acrylate, determined by infrared spectrophotometric analysis, was produced at the rate of 4.13 lbs./hr. The properties of the terpolymer are listed in Table I.

Melt Index is measured by ASTM D-1238-57T.

Tensile and yield strength in p.s.i. and elongation in percent of original length at break are measured by ASTM D-638-58T on specimens cut using die B of ASTM D-412-51T pulled at 10 inches per minute.

Rigidity is by ASTM D-747-58T.

TABLE I

| | |
|---|---|
| Melt index, °/min. | 1.00 |
| Tensile, p.s.i. | 2737 |
| Yield, p.s.i. | 3115 |
| Elongation, percent | 271 |
| Rigidity $\times 10^{-4}$, p.s.i. | 7.02 |

Example 2

Ethylene was copolymerized with either acrylic acid or methacrylic acid and the corresponding lithium salt of the acid to prepare terpolymer compositions containing at least 2 percent by weight of the lithium salt in a series of runs identified and further described in Table II below. The runs were carried out in a continuous manner in a 3 liter pressure autoclave stirred at 2,400 r.p.m. at a temperature of about 180° to 210° C. and a pressure of about 21,000 p.s.i. A 50 percent by weight methanol or ethanol solution of the lithium salts of the acids was prepared immediately prior to their being fed to the autoclave.

The catalyst, α,α-azoisobisbutyronitrile, was introduced into the autoclave in the form of a solution consisting of 4 percent by weight catalyst dissolved in a mixture of 80 parts benzene and 20 parts hexane.

For purposes of contrast, the above procedure was repeated to prepare lithium salt containing terpolymers having less than 2 percent by weight salt. The properties of these terpolymers are also summarized in Table II below:

TABLE II

| Run Number | 1 | 2 | 3 | 4 |
|---|---|---|---|---|
| Ethylene Feed, lbs./hr | 50.0 | 50.0 | 53.0 | 49.0 |
| Constituents of Alcohol Solution of Monomers: | | | | |
| Acrylic Acid, Percent | | 37.5 | 44.0 | |
| Methacrylic Acid | 44.0 | | | 44.0 |
| Li Acrylate, Percent | | 12.5 | 6 | |
| Li Methacrylate, Percent | 6 | | | 6 |
| Methanol, Percent | 50.0 | | 50.0 | 50.0 |
| Ethanol, Percent | | 50.0 | | |
| Alcohol Solution Feed Rate, lbs./hr | 2.25 | 3.3 | 1.75 | 1.3 |
| Catalyst Feed Rate, lbs./hr | 0.05 | 0.02 | 0.02 | 0.07 |
| Product Rate, lbs./hr | 2.25 | 6.0 | 4.0 | 4.2 |
| Amount Acid in Terpolymer, Percent | 16.2 | 10.0 | 8.8 | 9.4 |
| Amount Salt in Terpolymer, Percent | 3.7 | 4.6 | 1.4 | 1.0 |
| Melt Index | 113.3 | 17.5 | 2.2 | 9.9 |
| Tensile, p.s.i. | 2,785 | 2,912 | 2,430 | 2,568 |
| Yield, p.s.i. | 3,188 | 2,575 | 1,694 | 2,038 |
| Elongation, Percent | 126 | 342 | 415 | 432 |
| Rigidity $\times 10^{-4}$, p.s.i. | 6.87 | 5.13 | 2.95 | 3.72 |

By reference to Table II it is immediately apparent that terpolymers of the present invention (run numbers 1 and 2) containing more than 2 percent by weight of the lithium acid salt have substantially greater rigidities than terpolymers outside the scope of the present invention i.e. terpolymers containing less than two percent of the lithium acid salt (run numbers 3 and 4).

By way of further contrast, an ethylene/acrylic acid copolymer containing 14 percent by weight acrylic acid having the following properties:

| | |
|---|---|
| Melt index | 20 |
| Tensile, p.s.i. | 3145 |
| Yield, p.s.i. | 1350 |
| Elongation, percent | 540 |
| Rigidity $\times 10^{-4}$, p.s.i. | 1.3 | was mixed in a plastics screw extruder with sodium carbonate at a temperature of about 250° C., for about 60 seconds to neutralize approximately 40% of the acid in the copolymer to sodium acrylate. The resultant polymer product had the following properties:

| | |
|---|---|
| Melt index | 3.0 |
| Tensile, p.s.i. | 3950 |
| Yield, p.s.i. | 2200 |
| Elongation, percent | 380 |
| Rigidity $\times 10^{-4}$, p.s.i. | 3.4 |

What is claimed is:

1. A process for preparing ethylene polymers having improved rigidity which comprises reacting together at least about 50 percent by weight ethylene (a) with about 8 to about 20 percent by weight of an acid selected from the group consisting of acrylic acid and methacrylic acid and (b) 2 to about 40 percent by weight an alkali metal salt of the acid in the presence of a free-radical-producing catalyst at a temperature from about 100° to about 300° C. and at a pressure of from about 3,000 to about 50,000 pounds per square inch, said process being conducted in the presence of an organic solvent system which is a solvent for the acid and for the salt of the acid.

2. The process of claim 1 wherein the acid is acrylic acid.

3. The process of claim 1 wherein the acid is methacrylic acid.

4. The process of claim 1 wherein the alkali metal salt of the acid is sodium acrylate.

5. The process of claim 1 wherein the alkali metal salt of the acid is lithium acrylate.

6. The process of claim 1 wherein the alkali metal salt of the acid is sodium methacrylate.

7. The process of claim 1 wherein the alkali metal salt of the acid is lithium methacrylate.

References Cited

UNITED STATES PATENTS 2,956,046   10/1960   Glavis et al. _____ 260—80.5
3,271,373   9/1966    Wolff _____ 260—80.5

JOSEPH L. SCHOFER, *Primary Examiner.*

H. WONG, *Assistant Examiner.*